US007096125B2

(12) United States Patent
Padmanabhan et al.

(10) Patent No.: US 7,096,125 B2
(45) Date of Patent: Aug. 22, 2006

(54) ARCHITECTURES OF SENSOR NETWORKS FOR BIOLOGICAL AND CHEMICAL AGENT DETECTION AND IDENTIFICATION

(75) Inventors: Aravind Padmanabhan, Plymouth, MN (US); Subash Krishnankutty, North Haven, CT (US); Wing Au, Bloomington, MN (US); Mike Bazakos, Bloomington, MN (US); Brian Krafthefer, Stillwater, MN (US)

(73) Assignee: Honeywell International Inc., Morristown, NJ (US)

( * ) Notice: Subject to any disclaimer, the term of this patent is extended or adjusted under 35 U.S.C. 154(b) by 507 days.

(21) Appl. No.: 10/024,462

(22) Filed: Dec. 17, 2001

(65) Prior Publication Data

US 2004/0064260 A1 Apr. 1, 2004

(51) Int. Cl.
*G01N 31/00* (2006.01)

(52) U.S. Cl. ............................ 702/24; 702/19; 340/521

(58) Field of Classification Search ................... 702/23, 702/24, 26, 81; 700/30, 31, 44, 28; 436/1, 436/167; 340/521; 706/20

See application file for complete search history.

(56) References Cited

U.S. PATENT DOCUMENTS

| | | | | |
|---|---|---|---|---|
| 5,874,046 A | | 2/1999 | Megerle | 422/68.1 |
| 6,066,295 A | | 5/2000 | Bernstein et al. | 422/50 |
| 6,289,328 B1 | | 9/2001 | Shaffer | 706/20 |
| 6,346,983 B1 | | 2/2002 | Yufa | |
| 6,490,530 B1 | * | 12/2002 | Wyatt | 702/24 |
| 6,777,228 B1 | | 8/2004 | Lejeune | |
| 2003/0065409 A1 | * | 4/2003 | Raeth et al. | |

FOREIGN PATENT DOCUMENTS

EP 1158292 A2 11/2001

OTHER PUBLICATIONS

*Joint Biological Remote/Early Warning Systems* (*JBREWS*), 3 pages, (1999 or later).

*Joint Service Chemical and Biological Defense Program Overview*, FY98–FY99, 14 pages, (1999 or later).

"Chemical and Biological Defense Program, Annual Report to Congress", *Department of Defense,* (2000), 1–272.

Hills, R., "Sensing for Danger", *Science and Technology Review,* Retrieved from the Internet: http://www.linl.gov/str/JulAug01/pdfs/07¯01.2.pdf>,(2001), pp. 11–17.

Luo, R., et al., "Future Trends in Multisensor Integration and Fusion", *Industrial Electronics,* (1994), pp. 7–12.

Park, S. et al., "Fusion–based Sensor Fault Detection", *Proceedings of the 1993 International Symposium on Intelligent Control,* (1993), pp. 156–161.

Penny, D., "The Automatic Management of Multi–Sensor Systems", *Fusion vol. II,* (1998), pp. 748–755.

* cited by examiner

*Primary Examiner*—John Barlow
*Assistant Examiner*—Stephen J. Cherry
(74) *Attorney, Agent, or Firm*—Kris T. Fredrick

(57) ABSTRACT

A sensor network provides the ability to detect, classify and identify a diverse range of agents over a large area, such as a geographical region or building. The network possesses speed of detection, sensitivity, and specificity for the diverse range of agents. Different functional level types of sensors are employed in the network to perform early warning, broadband detection and highly specific and sensitive detection. A high probability of detection with low probability of false alarm is provided by the processing of information provided from multiple sensors. A Bayesian net is utilized to combine probabilities from the multiple sensors in the network to reach a decision regarding the presence or absence of a threat. The network is field portable and capable of autonomous operation. It also is capable of providing automated output decisions.

23 Claims, 16 Drawing Sheets

| p(A=R) | p(A=D) |
|---|---|
| 0.08 | 0.92 |

| MS | p(P=R) | p(P=D) |
|---|---|---|
| REJECT | 0.0 | 1.0 |
| DETECT | 0.0 | 1.0 |

| MS | p(A=R | p(A=D) |
|---|---|---|
| REJECT | 0.0 | 1.0 |
| DETECT | 0.36 | 0.64 |

| Ab | PCR | p(F=R) | p(F=D) |
|---|---|---|---|
| REJECT | REJECT | – – | – – |
| DETECT | REJECT | – – | – – |
| REJECT | DETECT | – – | – – |
| DETECT | DETECT | – – | – – |

OPTIMIZATION PROCESS

VARY SYSTEM CONFIGURATIONS AND DETECTOR THRESHOLDS TO:

- MAXIMIZE PROBABILITY OF DETECTION ($P_D$)
- MINIMIZE PROBABILITY OF FALSE ALARM ($P_{FA}$)
- MINIMIZE TIME OF RESPONSE ($T_R$)
- MINIMIZE CONSUMABLE COST ($)
- MAXIMIZE MEAN TIME BEFORE SERVICE (MTBS)

1310

$$Q \sim \frac{P_D \bullet MTBS}{P_{FA} \bullet T_R \bullet \$}$$

Q = FIGURE OF MERIT FOR THE NETWORK

DETERMINE AND OPTIMIZE THE FIGURE OF MERIT DEPENDING UPON THREAT SCENARIOS

FIG. 12

ARCHITECTURES OF SENSOR NETWORKS FOR BIOLOGICAL AND CHEMICAL AGENT DETECTION AND IDENTIFICATION

CROSS REFERENCE TO RELATED APPLICATION

This application is related to co-pending U.S. patent application Ser. No. 10/024462 "Architectures of Sensor Networks for Biological and Chemical Agent Detection and Identification" filed on the same date herewith.

GOVERNMENT FUNDING

The invention described herein was made with U.S. Government support under Grant Number MDA972-00-C-0052 awarded by DARPA. The United States Government has certain rights in the invention.

FIELD OF THE INVENTION

The present invention relates to sensors, and in particular to a sensor network for detection of chemical and biological agents.

BACKGROUND OF THE INVENTION

The threat of attack on military and civilian targets employing biological agents is of growing concern. Various technologies are being developed for the detection and identification of such agents. The technologies are broadly classified into standoff/early warning sensors, triggers, air sampler/concentrators, core detection techniques and signal processing algorithms. While several technologies are very good at detecting some agents or classes of agents, no one single technology detects all chemical and biological agents with a sufficient level of sensitivity and specificity due to the diverse range of agents that need to be detected and identified. The agents range from simple inorganic or organic chemicals to complex bio-engineered microorganisms. The agents may be in vapor form to solid form. The toxicity level may also vary between $10^{-3}$ grams per person to $10^{-12}$ grams per person. To further complicate the process of detecting such agents, the agents with the highest toxicity level are more difficult to detect with the speed and accuracy needed to effectively counter the agents.

Some prior attempts to solve the above problems integrate a small sub-set of the different sensor technologies into a network, but rely heavily on operator inputs and interpretation capabilities. They are not capable of autonomous operation nor do they provide automated output decisions. Such integrated sets of different sensors also do not provide a high probability of detection in combination with a low probability of false alarm.

SUMMARY OF THE INVENTION

A diverse range of chemical and/or biological agent detecting sensors are networked together. A controller receives input from each of the sensors identifying a probability of the presence of an undesired biological agent. The inputs are combined utilizing an evidence accrual method to combine probabilities of detection provided by the sensors to determine whether such agents are a threat with a greater probability than any individual sensor.

In one embodiment, some sensors in the network operate in a standby mode. They are controlled based on input from other sensors, and are placed in an active mode when a potential threat is detected. The network provides the ability to tailor sets of sensors based on an area to be protected in combination with different threat scenarios. In the case of a building or other enclosed structure, both large and small releases, as well as slow and fast releases, of agents may occur either internal or external to the structure. The rate of release is also variable. By correct placement of the sensors, each of these scenarios is quickly detected, and appropriate measures may be taken to minimize damage from the threat. The network is provides input to a heating and ventilation system, or the security management system, of the structure in a further embodiment to automate the control response.

In a further embodiment, the controller is divided into at least two layers. An integrating controller collects, combines and analyzes data and signals from a predetermined group of sensors. There are several integrating controllers in larger networks. An operating center controller receives information from the integrating centers and optionally directly from other sensors indicative of probabilities of detection of a threat. The operating center controller fuses the information from the integrating controllers and sensors, and combines the probabilities using an information fusion methodology, e.g., Bayesian net approach to provide a higher probability of accurate detection of a threat while minimizing false alarms.

In one architecture, the controllers are arranged in a hierarchy. Integrating controllers are arranged in orthogonal, parallel or mixed configurations. Orthogonal refers to measuring different agents or agent classes using different physical/biological mechanisms (sensors). Parallel refers to measuring the same agent/agent classes using similar or different mechanisms. Mix refers to a combination of orthogonal and parallel.

Sensors in the network are characterized in at least three different manners. A first type of early warning sensor, such as a light detection and ranging (Lidar) system is used to initially detect a potential threat from a distance. A broadband type of detector acts as a trigger in one embodiment. The broadband detectors such as a mass spectrometer is used to broadly detect chemicals present in the threat. Next, highly specific/sensitive detectors are triggered by the broadband detectors and employ antibody/PCR based sensing to precisely identify agents in the threat. Some of the sensors are optionally in a standby mode to conserve power and reagents used in testing until an initial detection is made by an active sensor.

BRIEF DESCRIPTION OF THE DRAWINGS

FIG. 12 is a pseudocode representation of an optimization process for determining a figure of merit for a sensor network.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
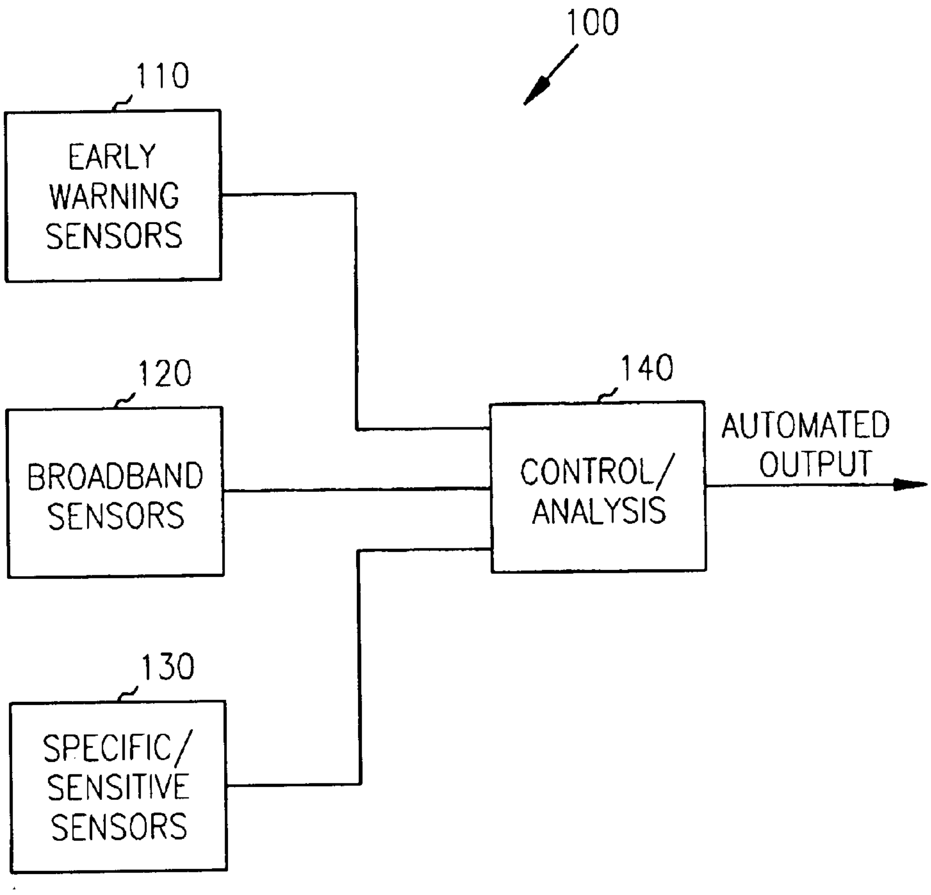
FIG. 1 is a simplified block diagram of multiple levels of sensors for a sensor network for biological and chemical agent detection.

A multi-level sensor architecture 100 for detecting biological and chemical agent threats is shown in block diagram in FIG. 1. A first level of early warning sensors 110 are useful outside of structures or in open areas to provide an early warning of a potential threat. Such sensors are also useful in large structures, such as stadiums or auditoriums to provide early warning of an internal release of an agent. Broadband detection types of sensors 120 are used in air intakes of buildings or near areas to be protected to provide fast response and to trigger operation of highly specific and sensitive sensors 130 which are used to specifically identify the threat.

Each of the sensors detects various threats with different levels of probability of detection and false alarm rate (both false positive and false negative). A controller 140 receives probability of threat information from the sensors and fuses the probabilities together to determine a probability of an actual threat with greater accuracy than that provided by the individual sensors. In one embodiment, a Bayesian net approach is used to combine the probabilities.

The controller 140 is also used to control the timing of the sensors. The early warning sensors operate in a sampling mode in one embodiment, and track atmospheric conditions to provide a baseline or calibration. It then detects deviations from the baseline. This helps to minimize false alarms resulting from sudden natural changes in weather. Early warning sensors 110 locate bio-aerosol clouds and measure particle size distribution. Examples of early warning sensors include Lidar (light detection and ranging) and trigger sensor. Broadband detection sensors 120, such as mass spectrometers provide rapid detection and classification of a wide range of agents. Examples of a broadband detection sensor are a trigger sensor (aerodynamic particle sizer for example) capable of measuring particle size and viability or a mass spectrometer. Broadband sensors are optionally used by the controller 140 to trigger downstream sensors, and hence power consumption and reagent consumption in the downstream sensors is minimized. Highly specific and sensitive detection sensors 130 provide identification of biological agents with a high probability of detection and low probability of false alarm. They also provide information valuable for treatment of affected personnel. Sensors of this type perform DNA analysis using the PCR technology, and antibody analysis using antibody-based assays.

Operation of the sensors is sequenced as described above or they may be operated in unison depending on the type of threat either detected, or anticipated. The capabilities of the sensors, threat types and areas to be protected are all taken into account when planning locations of sensors to optimize early detection and the ability to defend against various threats.

Figure 2:
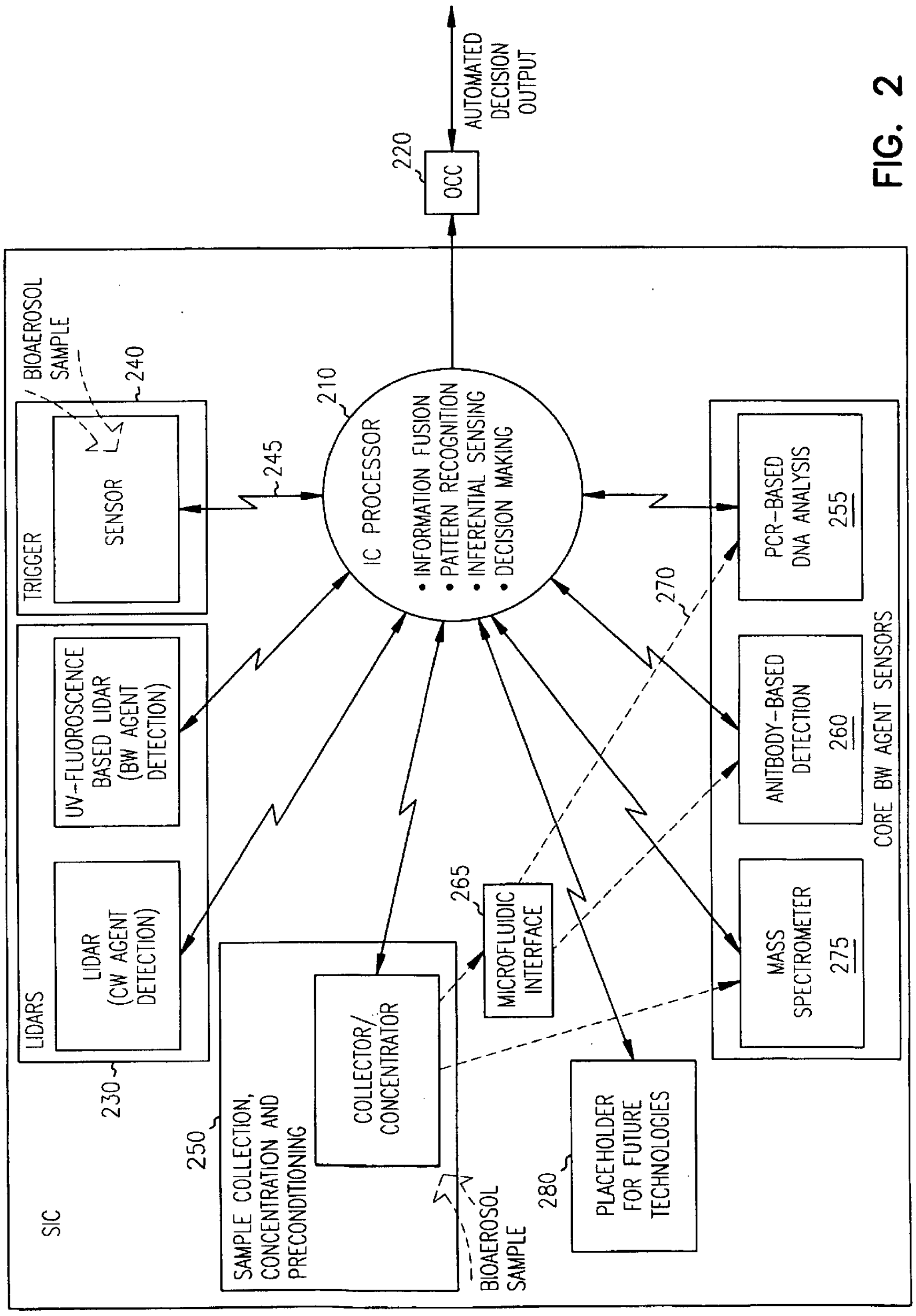
FIG. 2 is a block schematic diagram of a generic sensor network for biological and chemical agent detection.

FIG. 2 shows a more detailed block schematic diagram of a network of sensors with two levels of controllers. A sensor integrating controller (IC) 210 is directly coupled to sensors, and to an operating center controller (OCC) 220. The integrating controller 210 receives information from multiple sensors and fuses the information in one embodiment. Sensors in the network include Lidars 230 and triggers 240. Lidars are long range early warning sensors. Triggers 240 collect bioaerosol samples for analysis and can also measure the particle size and viability in the case of particle-based threats.

The sensors are coupled to the integrating controller 210 by two way communication means 245, such as RF transceivers, wires or other means of transferring information between the sensors and the controller. A bioaerosol sample is collected at a station 250. The sample is concentrated and preconditioned, and provided via a fluidic connection 270 to specific sensors 255, 260 and 275. Fluidic connection 270 is a microfluidic interface for transporting samples to the specific/sensitive sensors. Sensor 255 is a PCR based sensor that provides DNA analysis. Sensor 260 is an antibody based detector. A sensor 275 is a Mass Spectrometer or ion mobility mass spectrometer depending upon whether the threat is chemical or biological in nature. Other sensors now known or hereafter developed may be added to the network as indicated by placeholder 280.

Figure 3:
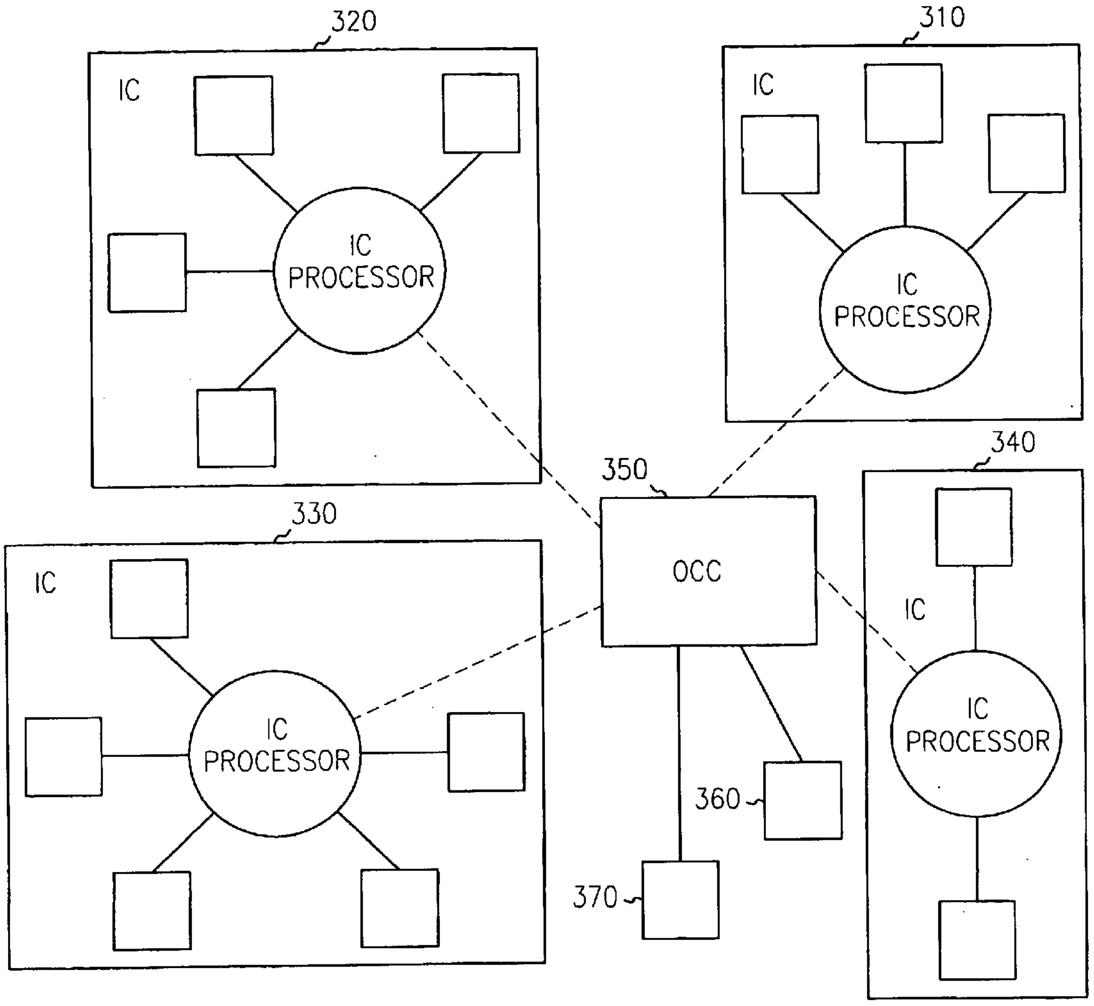
FIG. 3 is a block schematic diagram of an example sensor network having a three layer architecture.

In FIG. 3, a further example of a sensor network having multiple integrating controllers 310, 320, 330, and 340 is shown. Each integrating controller is used to collect, combine and analyze data and signals from each sensor component to monitor one area in one embodiment and provide probability and/or conditional probability of detection information fused from the sensors in its area to an operations controller 350 for a final decision. Sensors, referred to as components, need not be co-located, and are spatially distributed in one embodiment. The number of components monitored by one integrating controller varies depending on the threat scenario, as does the number of integrating controllers. In one embodiment, the integrating controller is a programmed personal computer or other computer with processor, memory and I/O devices. In further embodiments, sensors coupled to different integrating controllers overlap, providing some redundancy, verification information to the operations controller, and various levels of fault tolerance.

In a further embodiment, the operations controller is directly coupled to sensors 360 and 370, fuses the conditional probabilities and provides the decision. The integrating controllers can be used for one area to be protected, and tied into the operations controller to track a threat and anticipate what other areas need to be on alert, or take specific countermeasures based on projected movement of the threat. In further embodiments, the controllers provide data assessment and signal and data fusion, assigning weights to decisions provided from sensors.

Components in a network are chosen to match up with temporal response and sensitivity requirements of the agent threat spectrum. Biological agents may be present many hours before the onset of clinical symptoms, debilitation or death. However, early detection and identification of potential agent attacks, even without specific identification is exceedingly valuable because it enables simple prophylactic measures to be taken to dramatically reduce casualty rates. Areas to be protected are first modeled, and then a network architecture and components are selected. The component types, spatial locations and sequence of operation are selected to achieve a high probability of detection, $P_d$, and a low probability of false alarm, $P_{fa}$, both false positive and false negative.

Placement of chemical and biological sensors throughout the assessment domain requires information on where the sensors are to be placed. The characteristics of the different agents (chemical and biological) impact the transport of the agents to the sensor sampling location. In addition, the transport of these agents to the sensor should be maximized for optimal sensor response. These factors require that information be included on these effects for the final determination of the output response of the sensors.

Pre-placement computer simulations are done using information on the particle and gas phase characteristics to assist in placement determination. Additionally, simulations are done post-placement to determine the impact on the sensor response of its placement location. Individual components are experimentally tested to determine their probability of detection for various threats in a controlled environment by introducing known agents or simulants at predetermined rates to simulate various threats.

Signal processing by one of the controllers is used to combine individual responses of sensor components in order to improve the detection capabilities of the composite sensor network. Bayesian nets are used in one approach. Fuzzy rule based systems and Dempster Shafer theory of evidence are others. Bayesian nets ascribe conditional probabilities among the nodes of the network, and are characterized by their structure or connectivity relations among nodes.

In one configuration of a sensor network, a mass spectrometer detects the biological agents. An antibody sensor and PCR sensor are invoked to identify the biological agent. The results of the antibody and PCR sensors are fed into an integrating controller processor to make a reliable decision.

Figure 4:
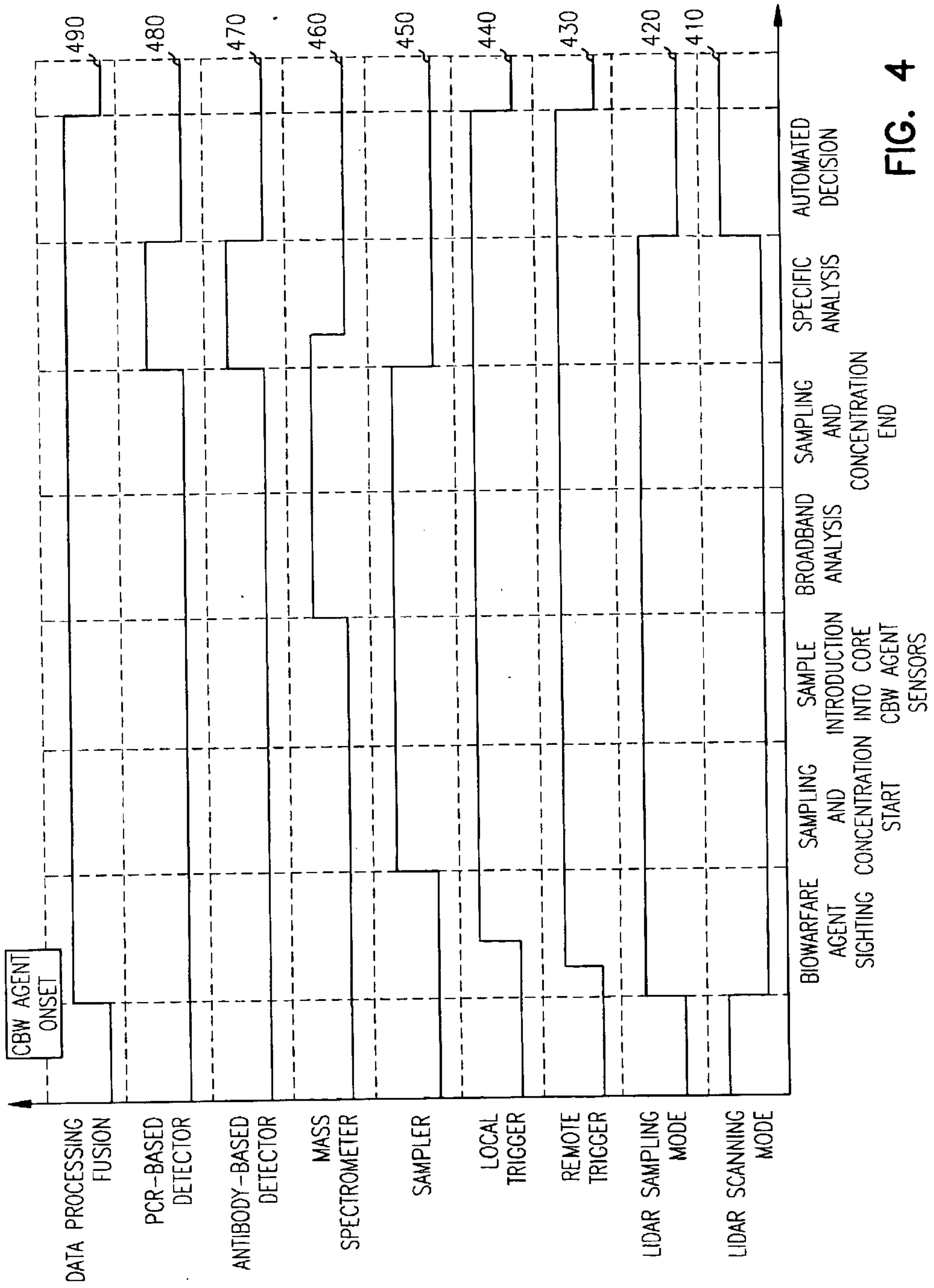
FIG. 4 is an example timing diagram showing on-times for various sensor components during a detection cycle.

A timing diagram of a network of sensors detecting a biological attack is shown in FIG. 4. It shows an operating sequence of various components controlled by an integrating controller or operations controller during one cycle of a threat. Lidars and triggers provide early warning of an agent attack. The Lidars scan areas, up to 20 km in one embodiment. The Lidars are placed to detect bio-aerosol clouds which might affect an area to be protected. The Lidars may be located within the area, or outside the area depending on prevailing winds or other factors such as line of sight available.

Triggers are usually placed on the ground, and can be both locally and remotely located relative to the area or building being protected by the network. Both of these sensors continuously monitor the particulate content of the air. Should a distribution of particles indicative of a biological or chemical agent attack be detected, an alarm is relayed to the integrating controller. A processor in the integrating controller sends a signal to the sampler/concentrator and samples of the air are collected for further analysis. Highly sensitive and specific core agent sensors, such as Mass-spectrometer, PCR and antibody-based sensors analyze these samples. Conclusive presence and identity of specific biological agents is ascertained by the PCR and antibody based sensors.

The timing diagram shows on-periods for the various sensor components for a controller, such as an integrating controller during one detection cycle. The diagram is for an outdoor threat scenario where the agent is dispensed from an aircraft, creating a bioaerosol cloud. If the agent is dispensed from the ground, then remote triggers will detect a potential threat before the Lidar. Note that the width of the pulse in FIG. 4 does not necessarily represent the amount of time that a sensor is on. Sensors may work in a sampling mode, continuous mode, or only in response to a perceived threat under control of a controller, depending on the type of the sensor. Some sensors may be battery operated and use reagents to perform their sensing functions. Controlling such sensors to only operate during a perceived threat conserves both power and materials required to perform the testing.

In FIG. 4, line 410 represents operation of the Lidar in a scanning mode. This mode is a low power mode used to establish a baseline, or history of returns to compare when potential threats are detected. Upon an agent sighting by the Lidar, it switches to a sampling mode 420 to provide more frequent information about the potential threat. Shortly after the Lidar detects, the remote triggers are turned on 430 to obtain further information about the threat. Remote triggers are triggers that are positioned remotely from the area to be protected. Local triggers which are located close to or within the area to be protected are turned on 440 shortly thereafter in one embodiment. The sampler starts collecting and concentrating agents in the air 450, and provides them to specific sensors. While the sampler is operating, a the mass spectrometer 460 provides a broadband analysis. Specific sensors are turned on 470 and 480 to specifically identify agents. Once a potential threat is detected, and the integrating controller starts receiving information from the sensors, it immediately starts 490 the data fusion process to determine the probability and identity of a threat.

Sensor outputs are fused using the concept of conditional probability and Bayesian criterion. Individual sensors are first characterized by their statistical performance and by their temporal performance or sequence of operation as shown by the timing diagram of FIG. 4. This is accomplished empirically in one embodiment. The sensor components are used in different configurations and queried differently depending on the phase of detection. Phases of detection comprise alarm phase, identification phase and confirmation phase. These phases correspond roughly to early warning sensors, broadband sensors and specific sensors. Some sensors may operate in more than one phase.

The sensor components are used in these phases according to a threat encounter. For example, for a large concentration-fast release of the bioagent, in the alarm phase, mass spectrometer statistical performance is conditionally evaluated (conditional probability) given that a UV particle counter has triggered. Then, in the identification phase, antibody sensor statistical performance is conditionally evaluated given that a mass spectrometer has screened the environment.

For low concentration-slow release of a threat, the component roles change. For example, in the alarm phase, an antibody component is conditionally evaluated given a positive output from a mass spectrometer. In the identification phase, a PCR component is evaluated given the result from the mass spectrometer. Traditional statistical methods in detection are performed for development of multi-phase, multi-scenario, multi-network architectures that lead to sensor data fusion using signal processing capabilities of the operational controller.

Operation of the sensor network is heavily influenced by the capabilities of the individual sensors and the physical nature of the biological threat agents. The trigger sensors provide nearly real-time information on the particle count, particle size distribution and ultraviolet fluorescence character of aerosol particles in the atmosphere. MS sensors provide sampling onto a solid substrate and analysis of the protein content of captured particles. AB assays determine binding of antigens to specific antibodies through the use of optical or other detection techniques. PCR assays use primers and probes to assay the presence of agent specific DNA (or UVA) in the sample. The latter two assays operate on a sample captured into fluid or on a sample transferred from a solid substrate and placed into a liquid buffer. These sensors operate on principles that investigate the biochemical nature of the threat. In essence, each of them examine biochemical components that make up an aerosol threat particle. The trigger sensor uses a light scattering and fluorescence approach. The mass spectrometer uses a spectroscopic approach to detection, while the AB and PCR sensors operate using a specific capture element. Only AB sensors examine the rich 3-d structure of the chemical signature and hence is truly a biological sensor. These sensors are known in the art and are continually being improved. New sensors are also being invented and are easily incorporated into the proposed network.

Figure 5:
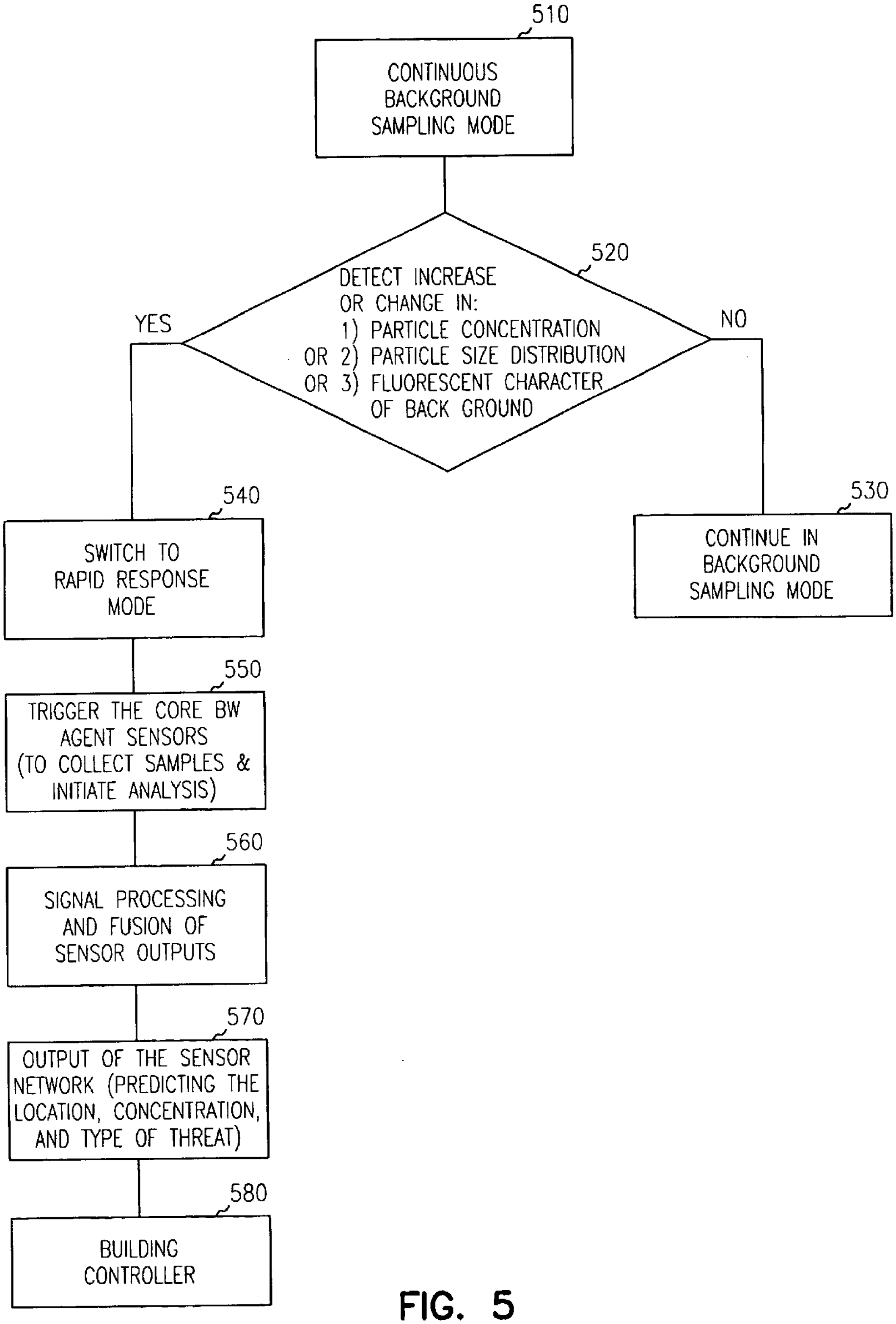
FIG. 5 is a flowchart of an operating mode for a sensor network for an indoor threat scenario.

FIG. 5 is a flowchart showing an example of operation of a sensor network for an indoor threat scenario. This example is for a high concentration threat. At 510, sensors are used in a background sampling mode. This mode conserves power and reagents of many of the sensors in the network. In one embodiment, only early detection sensors are operating at this time. At 520, if no changes in particle concentration, size distribution or fluorescent character of background atmosphere is detected, sampling continues in the background at 530. If such changes were detected, the network switches into a rapid response mode at 540. Core specific sensors are activated, and collection of samples is performed to initiate analysis at 550. A controller receives outputs from the sensors and performs signal processing and fusion of the outputs at 560. The controller then provides an output for the network, predicting the location, concentration and type of threat at 570. This output is also optionally provided to a building controller 580.

Figure 6:
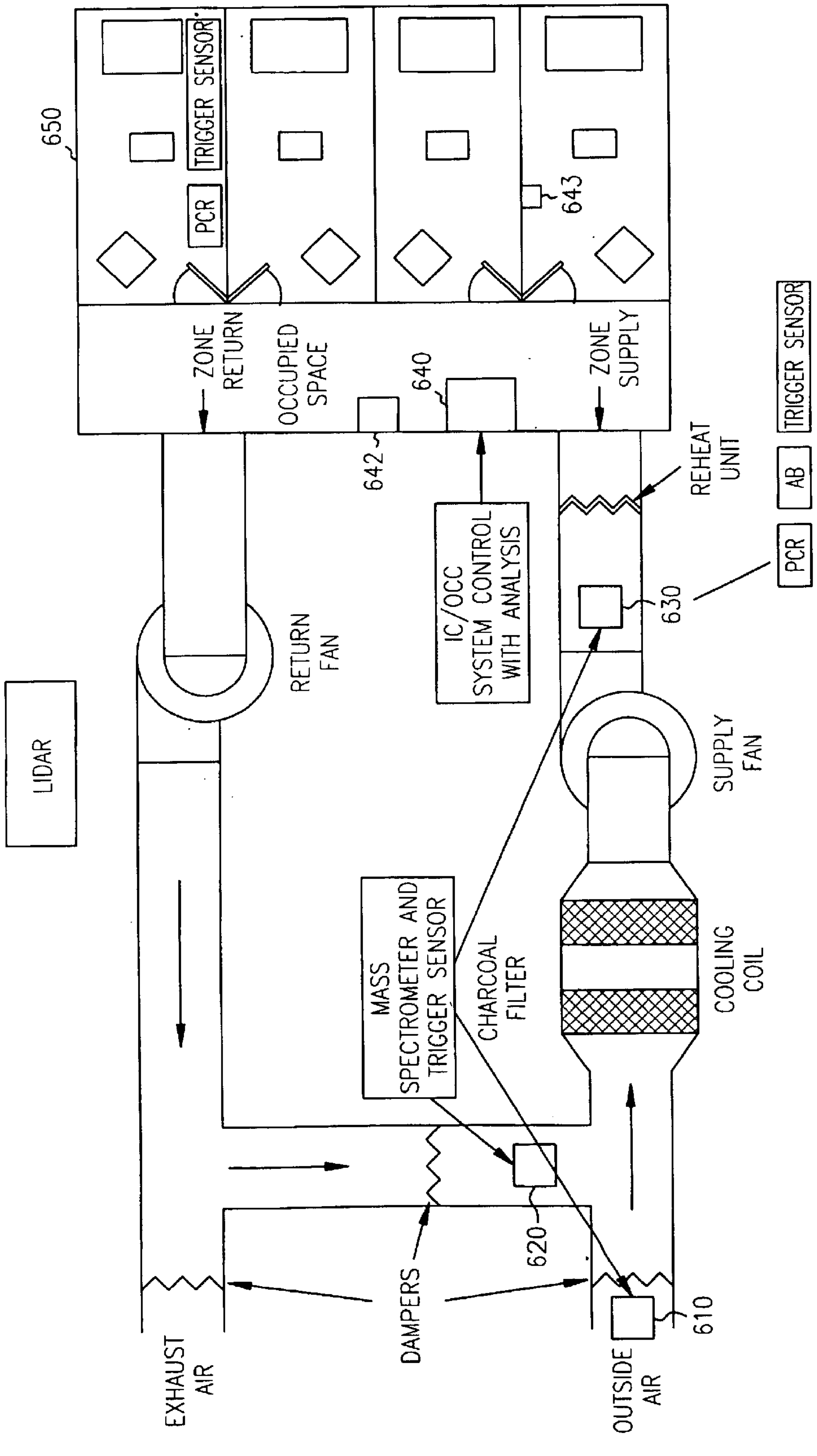
FIG. 6 is a block schematic diagram of a sensor network deployed in a heating, ventilation and air conditioning system for a building.

FIG. 6 is a block schematic diagram of a sensor network deployed in a heating, ventilation and air conditioning system for a building. A generic building consists of a moderately sealed frame with a fresh air inlet and exhausted air outlet. One or more HVAC systems draws fresh air into the building at a predetermined but variable rate. This fresh air mixes with recirculated air from the building in a mixing box and then passes through the air conditioning and heating units, filters, humidifiers, dehumidifiers, etc. and then is distributed throughout the building. The air exchange rate of the building is set by rate of fresh air to recirculated air, infiltration rate, and the exhaust rate of the building. Correct placement of sensors in this air exchange system results in the best opportunity for detection of the location of an attack and the threat agent in a time consistent with appropriate response.

One or more trigger sensors are positioned in fresh air inlets and return air inlets at 610 and 620. These components constantly monitor and learn particle counts, particle size distribution and fluorescent character of the ambient aerosol. The concept for the sensor network is to conduct long-term evaluations of the background to determine diurnal, climatic and seasonal changes. The learning continues for the entire lifetime of the sensor network. On a coarser time scale, each of the sensors in the network regularly investigates the aerosol background. For instance, a mass spectrometer samples air at nominal 5 minute intervals, and measures a background signal level. At longer intervals, AB and PCR sensors make similar routine measurements.

A mass spectrometer 630 combined with an air-to-air sample collector is positioned downstream from a supply fan, where fresh and reused air are mixed in one embodiment and is arranged such that it collects aerosol samples in the solid phase, from either the fresh air inlet or a return air inlet. The solid phase samples are then placed into aqueous solutions and analyzed by either AB-based or PCR-based sensors. This solid-to-liquid phase transfer can be automated by using microrobots. A fluidic interface is used in a further embodiment to supply samples to the specific sensors, which may be included in a container holding trigger sensors. All the sensors are communicatively coupled to a controller 640 for combining conditional probabilities provided by the sensors and further controlling operation of the sensors.

Further, Lidar sensors 642, 643 are placed in larger open areas, such as occupied space 645, or offices or labs 650, depending on expected threats. In further embodiment, Lidar sensors are placed exterior to the building, such as on top of the building to detect aerosol clouds from a distance. Further trigger types of sensors are optionally placed exterior to the building to detect a threat prior to it entering the building, or to confirm that the threat originated within the building. Note that the laser in the Lidar is designed to be eye-safe and hence suitable for operation in inhabited areas.

In one embodiment, the controller 640 is coupled to an HVAC controller to control the flow of air within the building in response to a threat. If the threat is exterior to the building, air is stopped from entering the building, or air is taken in through alternate air intakes that do not appear to be affected by the threat. If the threat is from within the building, its location can be identified, and air exhausted from the threatened area, while providing fresh, unaffected air to the non affected areas of the building. Evacuation alarms are also available.

Given a large release of biological agent in an interior environment, the indication of this threat is an increase in particle count, a change in particle size distribution and perhaps a change in the fluorescent character of particle from the background. While it would seem that all biological agents would produce an increase in fluorescent signal, this is not necessarily the case. It is conceivable that a fluorescent quencher could be co-aerosolized with the biothreat, leading to just an increase in particle count, albeit with a change in particle size distribution, as the only signature of a biorelease. Thus, a trigger device that explicitly measures particle counts and size distribution is used in the system. This basic mode of trigger may register many false positives. The false positive rate is lower for fluorescent threats because they are much more likely to be of biological origin. However, it is expected that for most realistic threats, the trigger will initiate many analyses by the other sensors in the network. When the aerosol particle character changes from the expected background to something different, the sensor network reacts by moving from the background sampling mode to a rapid response mode.

In a rapid response operating mode of a sensor network, the MS sensor is directed to collect a fresh sample from the proper aerosol collector such as return airflow. A much higher particle collection rate is initiated by greatly increasing airflow into the sampler. The goal is to reduce response times to below five minutes. The sample is collected and rapidly analyzed in the MS for an initial identification.

Based on this putative identification, a sample is collected by either the AB or PCR sensor or both for analysis. This choice is driven by the initial identification made by the MS. If the MS indicates that the agent is a spore, bacteria or virus (all containing nucleic acid) the primary back up identifier will be the PCR. However, the AB sensor also has the potential for doing this identification and so is also employed if the MS indicates reasonably high concentration levels. Conversely, if the MS indicates that the threat is due to a toxin, the AB sensor will provide the primary backup with the PCR sensor not likely providing any useful information. This mode of operation plays to the strengths of each sensor component technology and will help reduce the probability of false alarm for the overall sensor network.

Given a large exterior threat, it would first be characterized by trigger signals in the fresh air inlet. This could trigger a shut down of the inlet air, and a switch to 100% recirculation. Overpressurization of the building with clean air if possible would minimize infiltration. Additional advanced filtration and agent neutralization techniques could also be employed.

Given a slow leaker type of threat (low concentration agent release over an extended period of time), much more stringent requirements are placed on detection. The concentration of the agent particles will be very low compared to the background. It is unlikely that a trigger sensor will detect such a release relative to normal background variation. The network is operated in an untriggered mode for this scenario. The untriggered operation is a natural operating mode for the background investigation. For this scenario, the background measurements also provide indication of the presence of a slow leaker if the sensitivity and clutter rejection of the sensors in the network are high enough.

In one architecture for networks, the controllers are arranged in a hierarchy. Integrating controllers are arranged in orthogonal, parallel or mixed configurations. Orthogonal refers to measuring different biological agents or agent classes using different physical/biological mechanisms (sensors). Parallel refers to measuring the same agent/agent classes using similar mechanisms. Mix refers to a combination of orthogonal and parallel.

Figure 7:
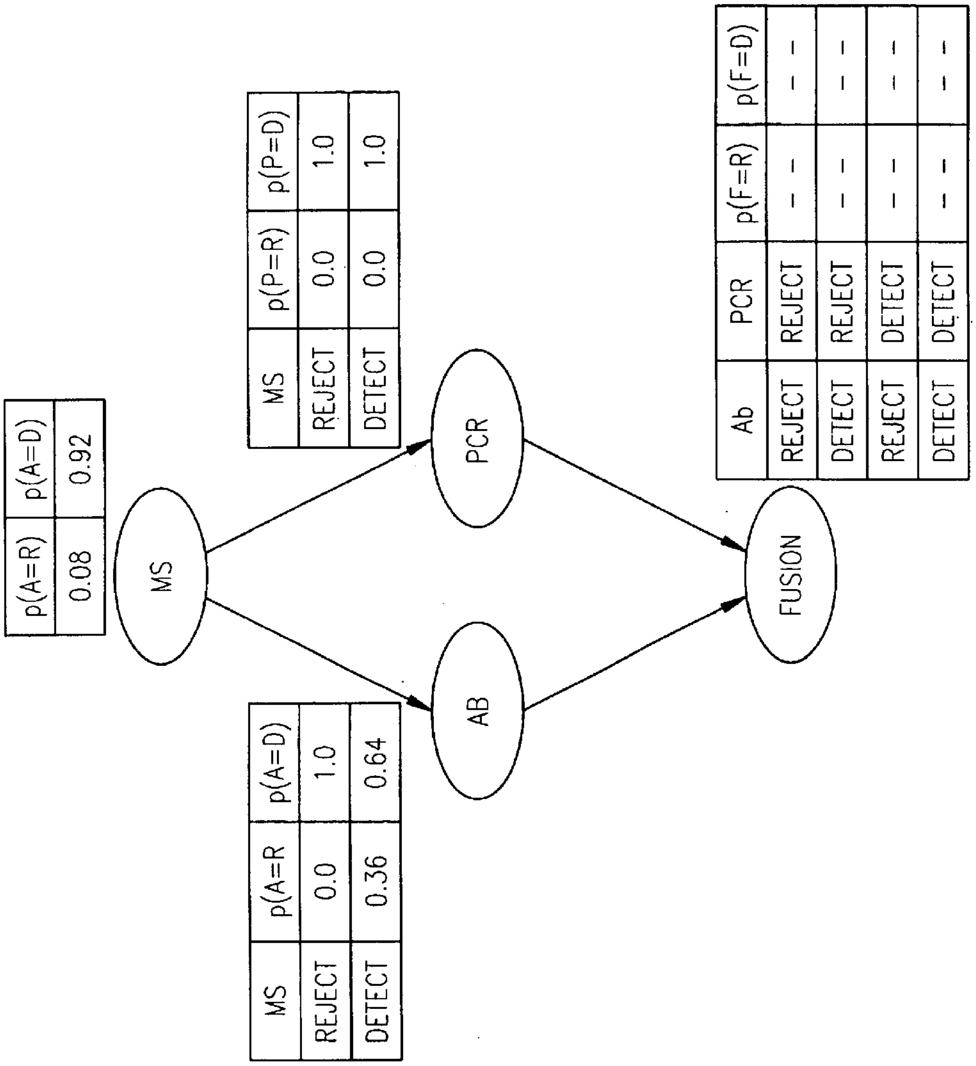
FIG. 7 is a block representation of a Bayesian net for combining probabilities of individual sensors in a sensor network.

The Bayesian net representation of the configuration of a sensor network consists of a graph structure and parameters. The graph structure shown in FIG. 7 consists of a set of nodes linked by directed arcs. It depicts how the sensor components (nodes) are connected and communicate among them. The parameters are represented by a conditional probability distribution (CPD), which defines the probability distribution of a node given its parents. The parameters encode a joint probability distribution of the system.

Each node makes a binary decision, either detect (D) or reject (R) the presence of a biological agent. The joint probability distribution of the configuration, p(T,A,P,F), is computed from the CPD from the Bayes rule as:

$$P(T,A,P,F)=P(T)*p(P/T)*p(A/T)*p(F/A,P)$$

Where T=Mass spectrometer, A=Anti-body sensor, P=PCR sensor, and F=Fused decision.

To complete the Bayesian net, the CPD of each node is filled in. This is done by combination of computation from empirical data and expected maximization (EM). CPDs are computed from the empirical data for as many nodes as possible. Missing data is filled in by exercising an EM method. The EM method finds a local maximum likelihood estimate (MLE) of the CPD in a two step iterative manner. The first step treats expected values as observed data and computes the CPD using the MLE principle. These two steps repeat to reach a maximum MLE for the network.

The three sensors' results are considered as a sequence of events because the response time of each sensor differs. In such case, the signal processing combines the results as they arrive. Assuming that the MS result arrives first, the Antibody second and the PCR result third, there are four cases to consider. The first case is that all three detect the agent. The combined likelihood is 1.0. In the second case, the Antibody sensor rejects the agent, while the other two sensors detect the agent. The combined result is a likelihood of 0.9782. In the third case, the PCR rejects the agent. The likelihood increases first, and then drops to zero. This is because the PCR always detects an agent when it is present. When the PCR does not detect agent, the combined result makes a no agent decision. In the fourth case, the MS rejects, and both the Antibody and PCR detect. The combined likelihood is 1.0, indicating a strong belief of the agent's presence. Yet, when the MS rejects, the likelihood is already 1.0. This is because the effect of the MS does not directly impact the fusion node. There is no LINK between the fusion node and the MS node. That is, the fusion node is independent of the MS node.

The Bayesian net that is illustrated in this example represents only one of many possible configurations of sensors. For example, it becomes another configuration if the output of the MS feeds into the fusion node. An optimization process is applied to determine the optimal configuration based on a system figure of merit.

The number of data samples should be large to obtain better results. Relevant knowledge, such as expected combined results are also fed into the network in one embodiment. A second network is optionally used in parallel with the network to identify false alarms. The dual network has the same structure, but different false alarm CPDs. Further, each biological agent will have its own Bayesian net, which is integrated with the other networks to provide independent probabilities for each agent.

Figure 8A:
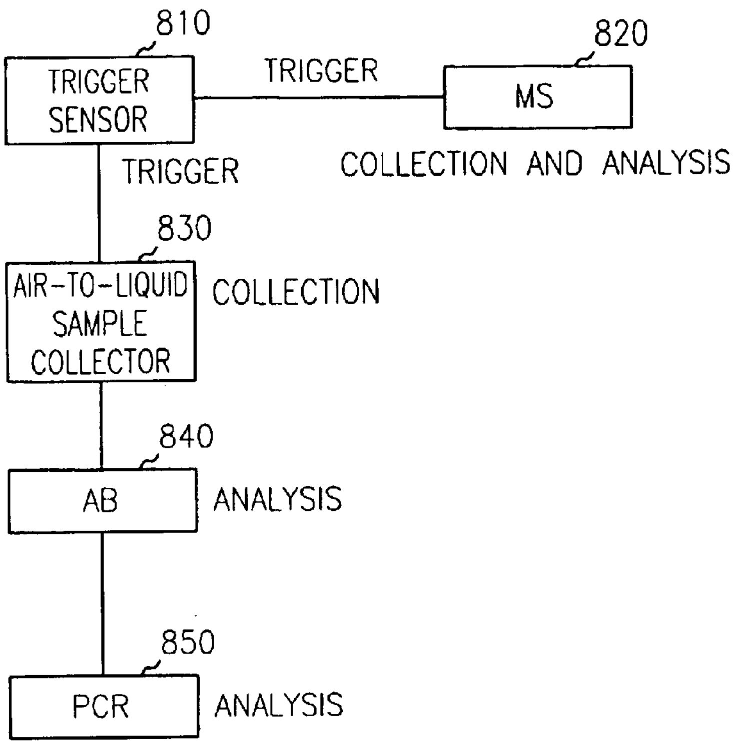
FIGS. 8A, 8B, 8C, and 8D are block diagram examples of different component configurations.
Figure 8B:
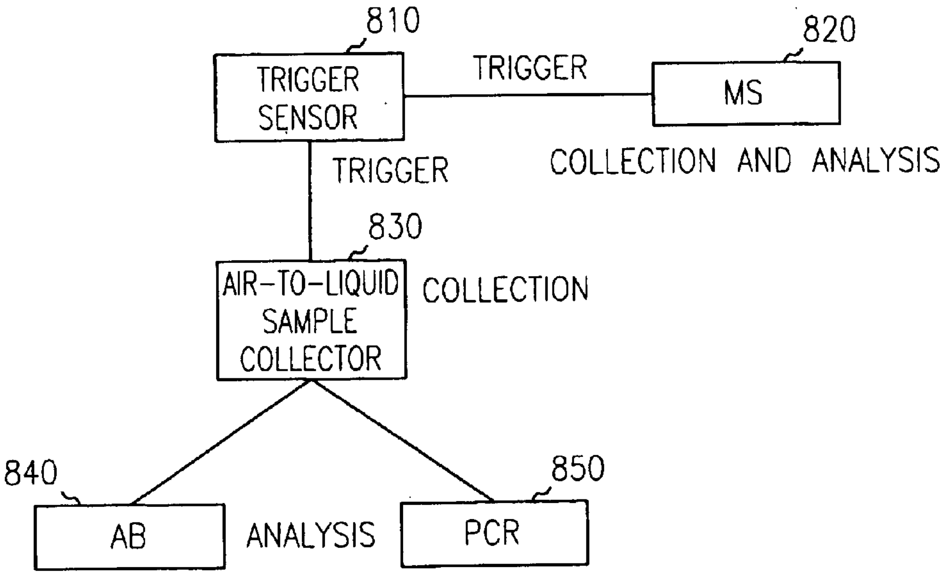
Figure 8C:
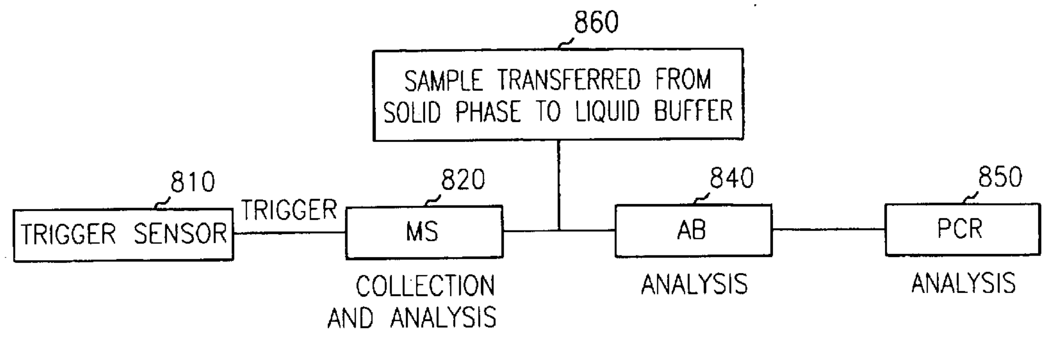
Figure 8D:
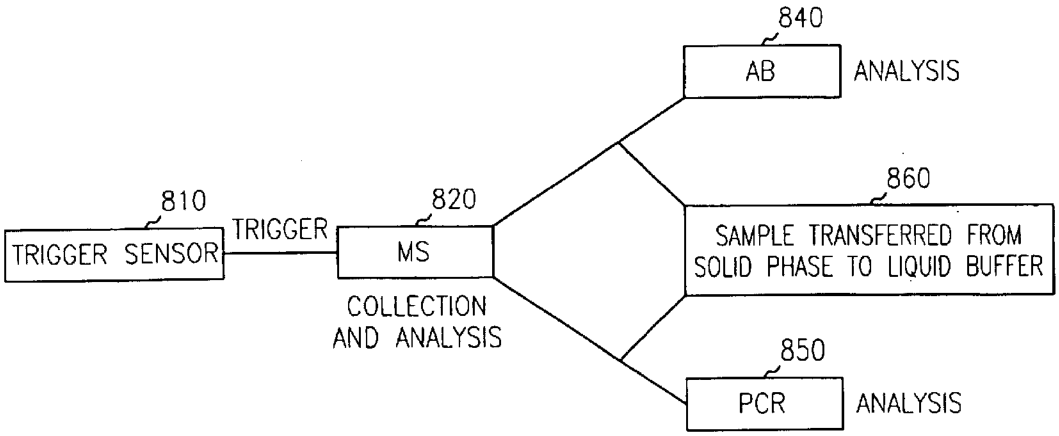

Several different sensor configurations are shown in FIGS. 8A, 8B, 8C and 8D, wherein like reference numbers are used to refer to like components. In FIG. 8A, a trigger 810 acts as an early warning sensor, activating a collection and analysis device 820 comprising a tape/mass spectrometer system. Collection further occurs at air-to-liquid sample collector 830, followed by AB analysis 840 and PCR analysis 850 in sequence. FIG. 8B shows a similar configuration, however AB and PCR analysis occurs concurrently. In FIG. 8C, the configuration of trigger 810, is followed by collection and analysis 820. Then, a sample is removed from the tape into liquid form at 860 for analysis by AB 840 and PCR 850. In FIG. 8D, the trigger 810 is again followed by collection and analysis 820 and the removing the sample from the collection device into a liquid buffer 860. AB analysis 840 ad PCR analysis 850 are performed concurrently.

Different network configurations are based on a the figure of merit. Knowing the performance of each individual sensor from a software model or empirical evidence as described above, different combinations of integrating controllers and operation controllers are designed for each area to be protected. A local Bayesian net for decision fusion is used at each integrating controller to derive the integrating controllers performance. This then propagates through a global Bayesian net implemented at the operation controller. The global net computes an aggregated network performance. Different combinations of controllers constitute different networks and their corresponding figures of merit. An optimal network is selected from these networks.

Component characterization and TD, time of detection are described for various components in one embodiment. Characterizations and TD may change as components are improved over time, and as new components are invented. A TRIGGER SENSOR has a TD on the order of seconds and consumes little power. This type of component is useful for continuous monitoring or sampling. The MS has a time of detection on the order of less than 5 minutes. It consumes chemicals at a medium consumption level, and should not be run continuously without sufficient resources to replace the tapes and chemicals on a regular basis. Transferring the sample from solid phase into a liquid is performed in approximately 1–2 minutes, and requires buffer and sonication, which rates fairly low on a consumables/logistics scale. AB components analyze within approximately 15 minutes but have a high consumption level. PCR components analyze within approximately 30 minutes and have a very high level of consumption of reagents. These are examples for presently existing sensors. New sensors are characterized as they become available and are integrated appropriately into the networks.

Figure 9:
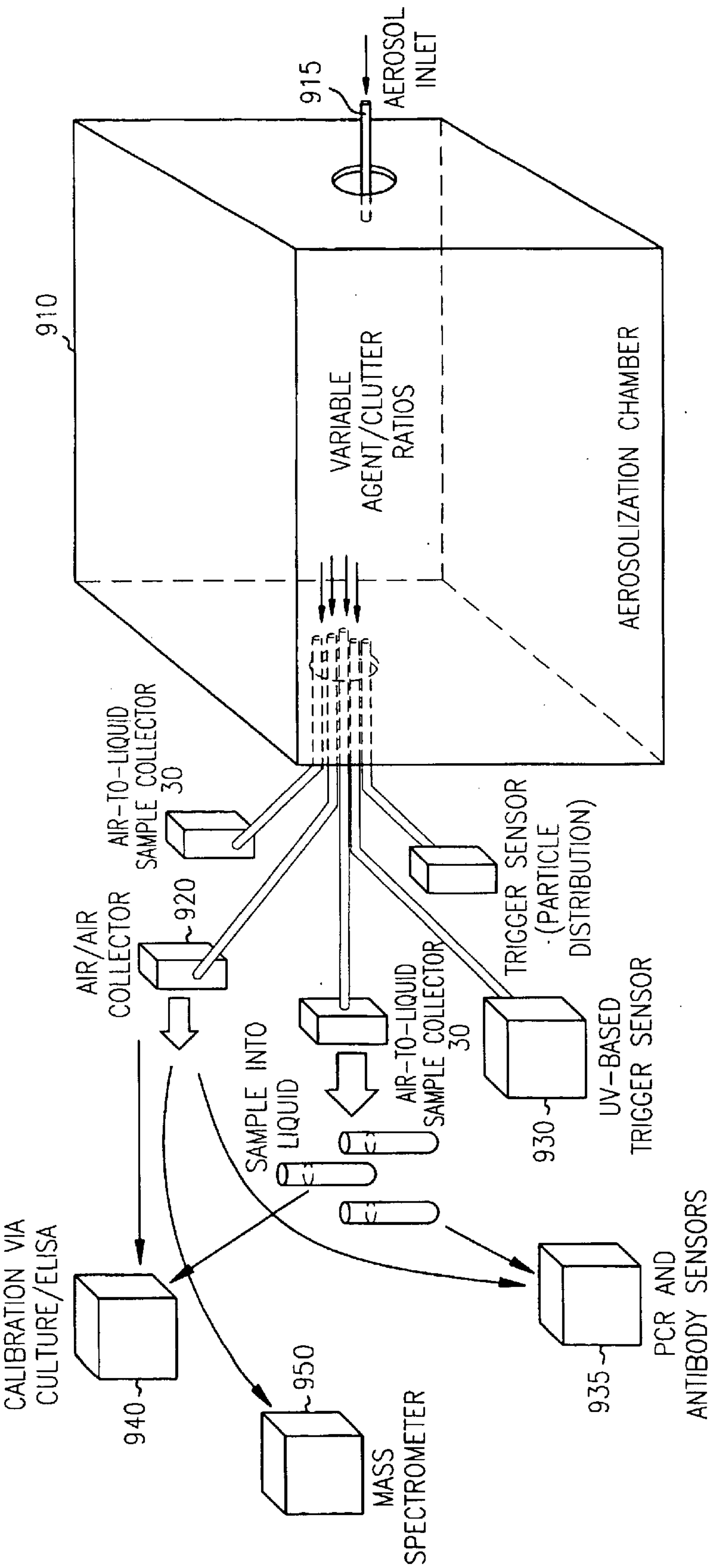
FIG. 9 is a block diagram showing a testing arrangement for sensors.

A system for testing sensors is shown in FIG. 9. An aerosolization chamber 910 receives an aerosol via an inlet 915, and provides a variable concentration of a known sample to multiple collectors 920 and sensors 930. The collectors provide samples in liquid form for sensors that require such a form. These sensors include PCR and antibody sensors represented at 935, and a cell culture device 940 which is used to calibrate the testing system by providing a known accurate measure of the sample. Samples are also provided for use by the cell culture device 940 and one or more mass spectrometers 950.

Figure 10:
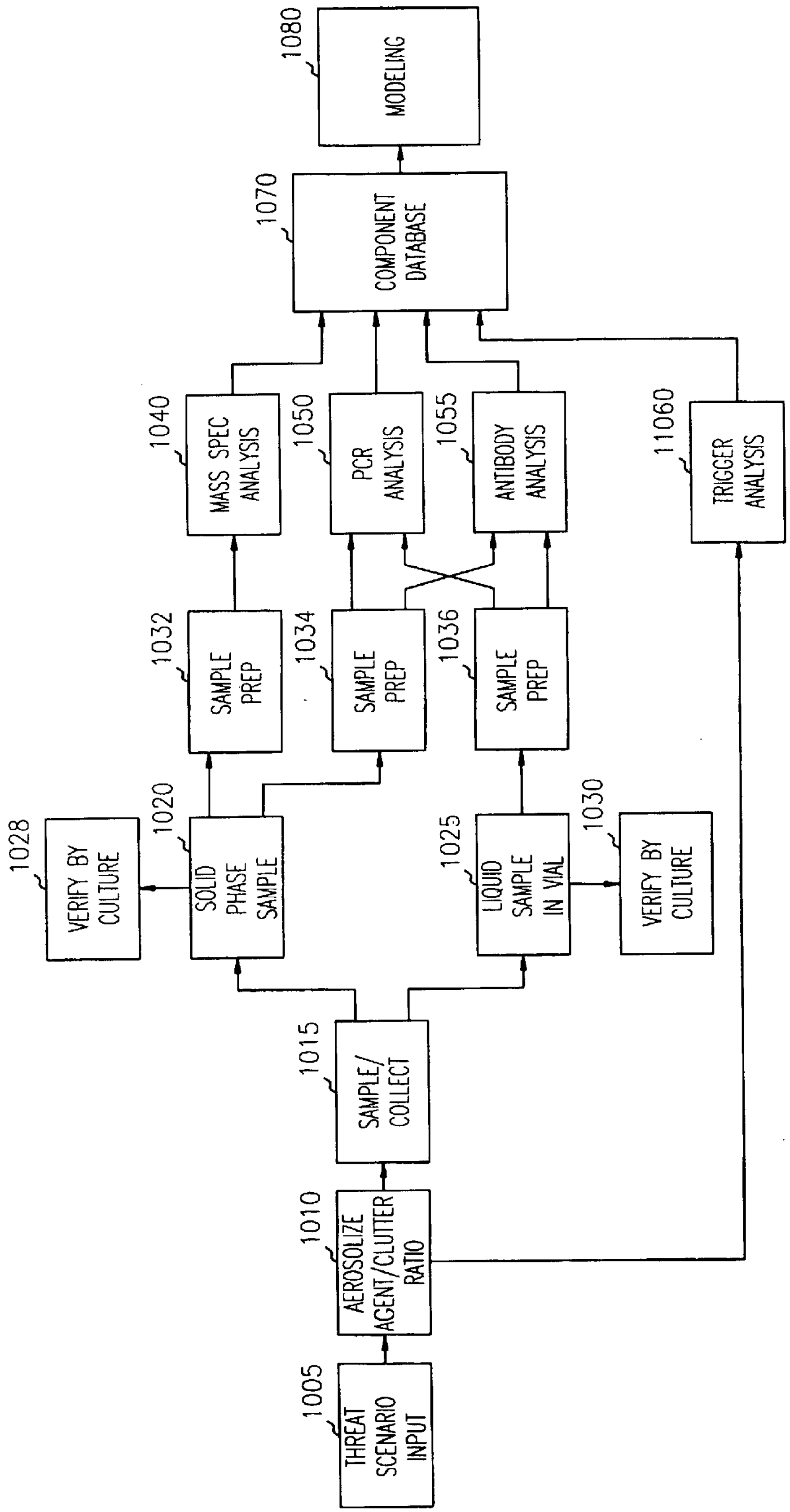
FIG. 10 is flow diagram depicting modeling of sensors.

FIG. 10 provides a flowchart of the methodology used to develop software models for the various sensor components for a given threat scenario. Experimental/empirical information is used to develop the software models. Threat scenario means agent type/clutter type, and spatial/temporal distribution of agent/clutter. Testing using the system is repeated for different agent/clutter ratios, simulating threat scenario inputs. A threat scenario is input at 1005 and aerosolized at 1010 in various clutter ratios. The aerosol is provided at 1015 for sampling and collection. A dry sample is created at 1020, and a liquid phase sample is provided in a vial at 1025. Both the dry sample and liquid sample are verified by culture at 1028 and 1030 respectively. The dry sample is provided to a sample preparation blocks 1032 and 1034. The liquid sample is provided to a sample preparation block 1036. The sample preparation blocks transform the sample to a form suitable for sensing by various sensors. The sensors include mass spectrometer 1040, PCR Analysis 1050 and antibody analysis 1055. The aerosol is also provided directly from block 1010 to a trigger sensor 1060. Each of the sensors also includes an analysis module that creates data corresponding to characterization and TD as described above for each sensor for various samples. This information is provided to a component database 1070 for modeling by block 1080.

Figure 11:
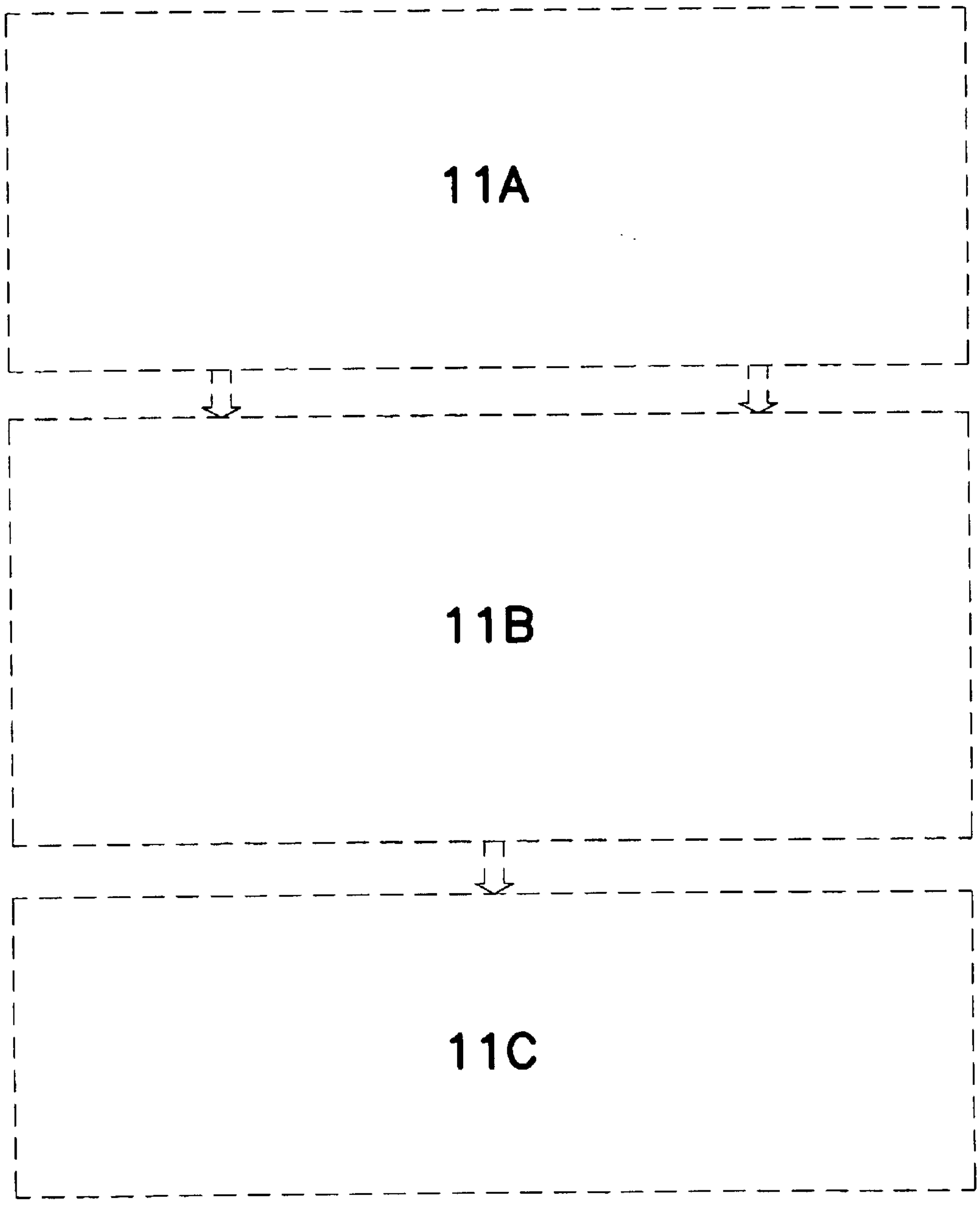
FIG. 11 is a block diagram showing the relationships between FIGS. 11A, 11B, and 11C.
Figure 11A:
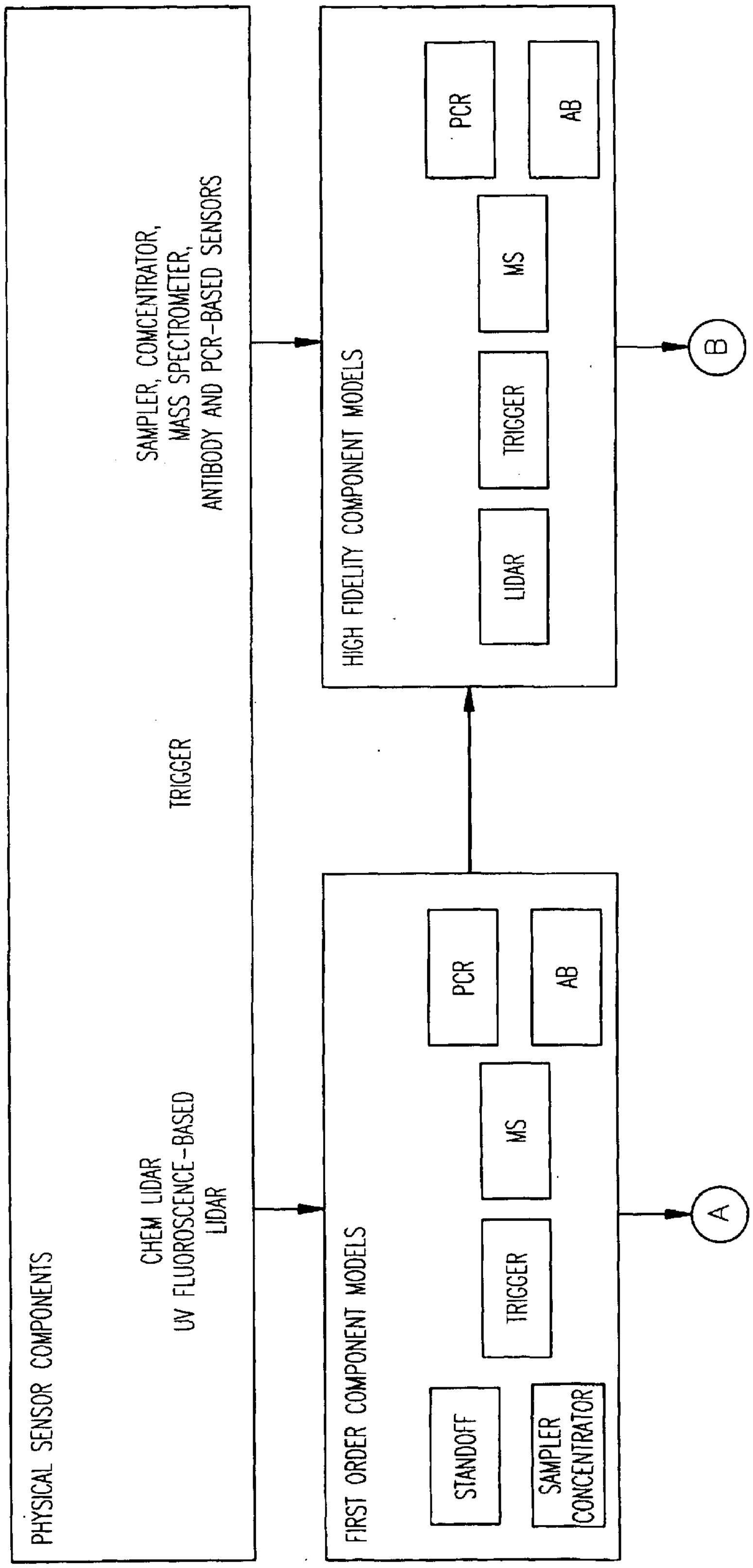
FIGS. 11A, 11B, and 11C are block diagrams showing stages of generation of an agent detection system for a building.
Figure 11B:
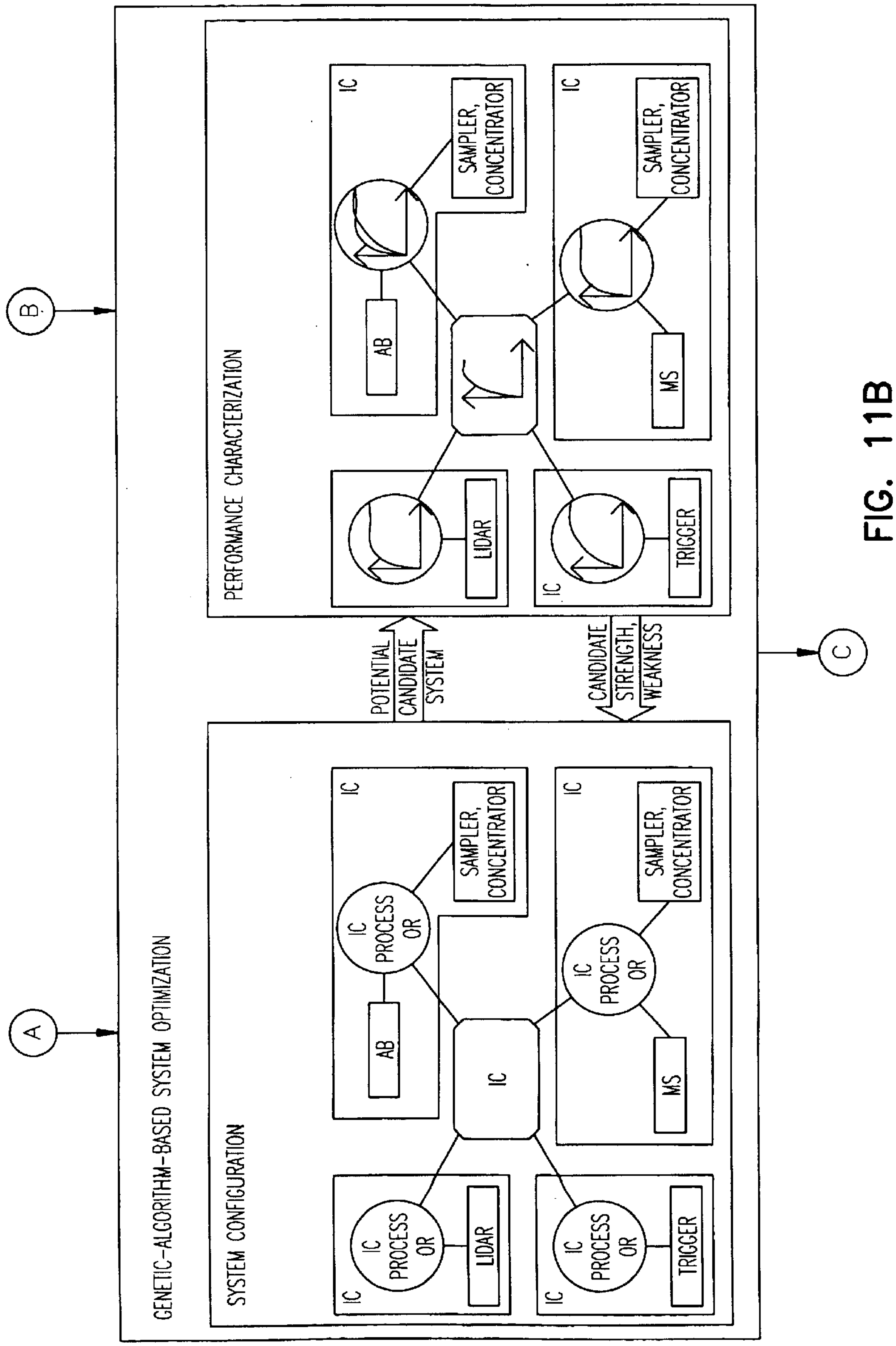
Figure 11C:
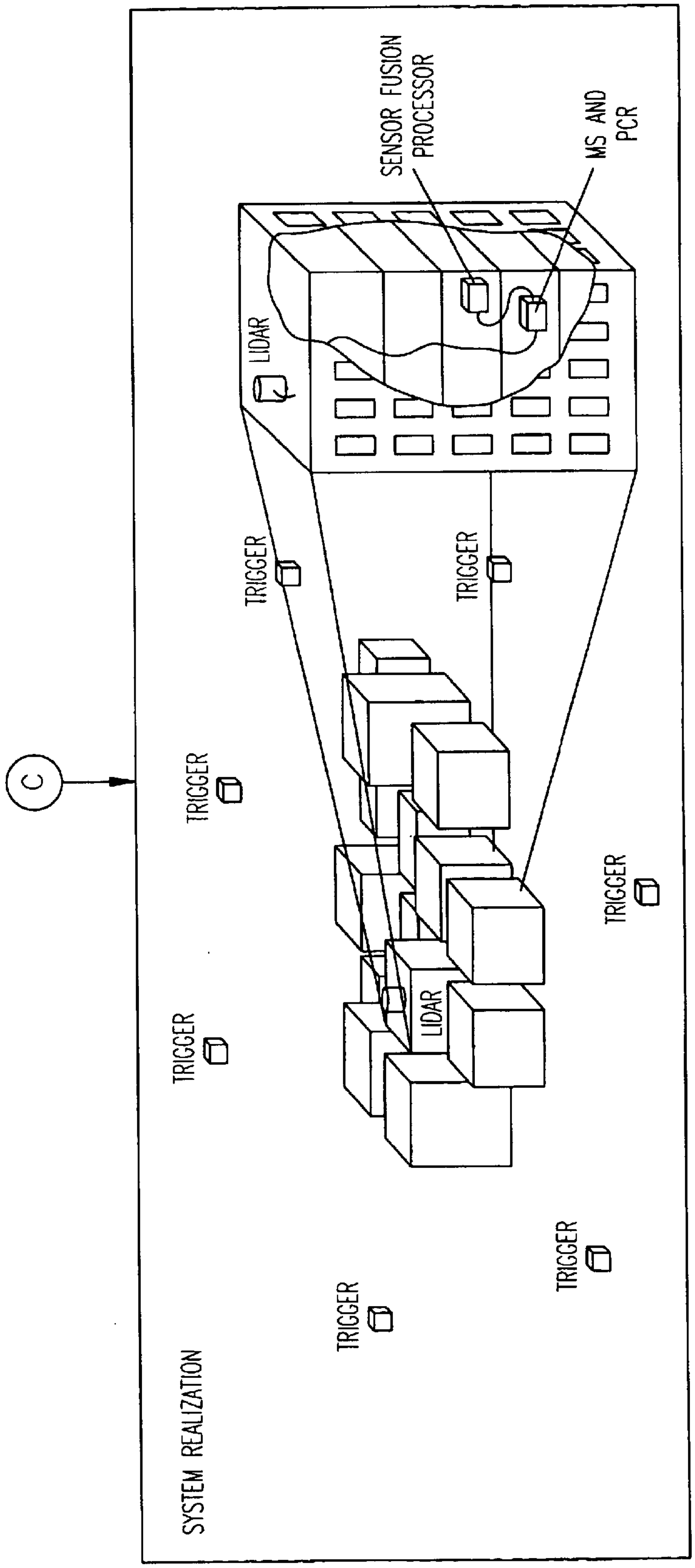

FIG. 11 shows the manner in which FIGS. 11A, 11B and 11C are located with respect to each other. In combination, they comprise block diagrams showing stages of generation of an agent detection sensor or network for a building. FIG. 11 A represents first order component models of physical sensor components, and creation of high fidelity component models. FIG. 11B shows the connection between the models created in FIG. 11A and actual system configuration and performance characterization of a potential candidate system. Candidate strengths and weaknesses are identified. A genetic-algorithm-based system optimization is performed. Finally, FIG. 11C shows an actual layout of sensors and controllers for a building.

An optimization process is performed for any given area in accordance with the pseudocode of FIG. 12. System configurations and detector thresholds are varied to maximize probability of detection ($P_D$), minimize probability of false alarm ($P_{FA}$), minimize time of response ($T_R$), minimize consumable cost ($), and maximize mean time before service (MTBS). The equation of FIG. 10 at 1010 is used to find Q, the figure of merit for the network. Each system is determined and optimized to provide a best response depending on threat scenarios. Specific applications include for example, indoor, outdoor, critical space continuous surveillance, large area spotty surveillance, early warning and others.

Conclusion

The sensor network provides the ability to detect, classify and identify a diverse range of agents over a large area, such as a geographical region or building. The network possesses speed of detection, sensitivity, and specificity for the diverse range of agents such as chemical and biological agents. A high probability of detection with low probability of false alarm is provided by the processing of information provided from multiple sensors. An evidence accrual method, such as a Bayesian net is utilized to combine sensor decisions from the multiple sensors in the network to reach a decision regarding the presence or absence of a threat. The sensor network is field portable and capable of autonomous operation. It also is capable of providing automated output decisions.

Different functional level types of sensors are employed in the network to perform early warning, broadband detection and highly specific and sensitive detection. Early warning sensors locate bio-aerosol clouds and measure particle size distribution. Examples of early warning sensors include Lidars and trigger sensors. Broadband detection sensors provide rapid detection and classification of a wide range of agents. One example of a broadband detection sensor is a mass spectrometer. By using the broadband sensor to trigger downstream sensors, power consumption and reagent consumption in the downstream sensors is minimized. Highly specific and sensitive detection sensors provide identification of biological agents with a high probability of detection and low probability of false alarm. They also provide information valuable for treatment. Sensors of this type perform DNA analysis using PCR, and antibody analysis using antibody-based assays.

The different levels of sensors and diversity of sensors, combined with the fusion of outputs from multiple sensors provide the ability to design networks of sensors for specific areas or structures for different types of threats. Early warning sensors are useful outside of structures or in open areas to provide an early warning of a potential threat. Such sensors are also useful in large structures, such as stadiums or auditoriums to provide early warning of an internal release of an agent. Broadband detection types of sensors are used in air intakes of buildings to provide fast response, and highly specific sensors are used within or near areas to be protected in one embodiment. The operation of the sensors is sequenced or in unison depending on the type of threat.

Most of the sensors used in the embodiments above are designed for biological agent detection. Chemical agent detection sensors are easily integrated into biological agent detection networks, and into purely chemical agent detection networks. Examples of chemical agent detectors include ion mobility mass spectrometers, surface acoustic wave (SAW) sensors, and gas sampling mass spectrometers. As mentioned previously, there is no known limit to the types of sensors that can be used in agent detection networks. As long as the performance and capabilities of the sensors are known, they can be used in such networks.

What is claimed is:

1. A network for detecting biological agents, the network comprising:

a plurality of sensors for detecting agents in an area and generating a signal comprising a probability of accuracy;

a controller communicatively coupled to the sensors for receiving the signals from the sensors wherein the controller utilizes an evidence accrual method to combine probabilities of detection provided by the sensors to determine whether such agents are a threat with a greater probability than any individual sensor.

2. The network of claim 1 wherein the sensors are selected from the group consisting of trigger sensors, Lidar, mass spectrometer, antibody, and PCR detectors.

3. The network of claim 1 wherein the controller comprises multiple controllers.

4. The network of claim 3 wherein the controllers comprise multiple integrating controllers coupled to different sets of sensors, and an operating controller coupled to the integrating controllers.

5. The network of claim 4 wherein the number of integrating controllers is variable to cover and protect areas of diverse size.

6. The network of claim 4 wherein a set of sensors coupled to one integrating controller at least partially overlaps a set of sensors coupled to another integrating controller to provide verification or fault tolerance.

7. The network of claim 1 wherein the sensors are selected from the group consisting of early warning, broadband and specific sensors.

8. The network of claim 1 wherein information from sensors not targeted for a specific threat is used to help identify such specific threat.

9. The network of claim 1 wherein the evidence accrual method comprises a Bayesian net.

10. A network for detecting biological agents, the network comprising:

a plurality of sensors for detecting agents in multiple areas and generating a signal comprising a probability of accuracy;

a plurality of integrating controllers communicatively coupled to selected groups of sensors protecting each area for receiving the signals from the sensors to determine whether such agents are a threat to a respective area with a greater probability than any individual sensor; and an operating controller that receives information propagated to it from the integrating controllers and performs data fusion to determine a final decision for the entire area under protection wherein the operating controller comprises an evidence accrual method for performing the data fusion.

11. The network of claim 10 wherein each integrating controller comprises a Bayesian net for determining whether such agents are a threat to the area it protects.

12. The network of claim 10 wherein the evidence accrual method comprises a Bayesian net.

13. A network for detecting biological agents in a building, the network comprising:

a plurality of different types of sensors for detecting biological agents in the building and generating a signal comprising a probability of detection of a biological agent, wherein the sensors are placed at different locations within the building based on the characteristics of the sensor;

a controller communicatively coupled to the sensors for receiving the signals from the sensors to determine whether an agent threat exists for the space.

14. The network of claim 13 wherein at least one sensor is monitoring threats external to the building.

15. The network of claim 14 wherein the at least one sensors comprises a Lidar.

16. A method of detecting chemical and biological agent threats using a diverse network of sensors, the method comprising:

collecting information from sensors comprising the conditional probability of detection of biological agents, wherein one or more controllers collects information from all the sensors in the diverse network;

combining the conditional probabilities of detection from individual sensors via the one or more controllers to increase the accuracy of the overall probability of the detection of a threat.

17. The method of claim 16 wherein the sensors are selected from the group consisting of FLAPS, Lidar, mass spectrometer, antibody, and PCR detectors.

18. The method of claim 16 wherein the information from the sensors is combined utilizing a Bayesian net to combine conditional probabilities of detection provided by the sensors.

19. The method of claim 16 wherein the sensors are selected from the group consisting of early warning, broadband and specific sensors.

20. The method of claim 16 wherein information from sensors not targeted for a specific threat is used to help identify such specific threat.

21. A method of designing a network for detecting threats from biological and chemical agents, the method comprising:

determining a probability of detection for each of multiple sensors for a given threat;

generating an algorithm for decision fusion for each of multiple local groups of sensors; and generating an algorithm for decision fusion for a combination of the multiple local groups of sensors.

22. The method of claim 21, wherein the algorithm comprises a Bayesian net.

23. The method of claim 21 and further comprising:

creating different combinations of local and combined groups of sensors;

determining the performance of each of the different combinations; and selecting an optimal combination based on the performance of the different combinations.

* * * * *